(12) United States Patent
Schmier et al.

(10) Patent No.: US 9,183,137 B2
(45) Date of Patent: Nov. 10, 2015

(54) STORAGE CONTROL SYSTEM WITH DATA MANAGEMENT MECHANISM AND METHOD OF OPERATION THEREOF

(71) Applicant: SMART Storage Systems, Inc., Chandler, AZ (US)

(72) Inventors: Jacob Schmier, Gilbert, AZ (US); Mark Dancho, Chandler, AZ (US); James M Higgins, Chandler, AZ (US); Ryan Jones, Mesa, AZ (US); Robert W Ellis, Phoenix, AZ (US)

(73) Assignee: SMART STORAGE SYSTEMS, INC., Milpitas, CA (US)

( * ) Notice: Subject to any disclaimer, the term of this patent is extended or adjusted under 35 U.S.C. 154(b) by 202 days.

(21) Appl. No.: 13/779,352

(22) Filed: Feb. 27, 2013

(65) Prior Publication Data

US 2014/0244899 A1  Aug. 28, 2014

(51) Int. Cl.
  *G06F 12/02* (2006.01)
  *G06F 3/06* (2006.01)

(52) U.S. Cl.
  CPC .......... *G06F 12/0246* (2013.01); *G06F 3/0616* (2013.01); *G06F 3/0631* (2013.01); *G06F 3/0659* (2013.01); *G06F 3/0688* (2013.01)

(58) Field of Classification Search
  CPC ............ G06F 11/1451; G06F 11/2064; G06F 11/2082; G06F 12/00; G06F 12/12; G06F 12/08; G06F 12/122; G06F 12/02; G06F 12/10; G06F 12/0238; G06F 17/30215; G06F 17/30578; G06F 2201/84
  See application file for complete search history.

(56) References Cited

U.S. PATENT DOCUMENTS

| | | | |
|---|---|---|---|
| 4,048,481 A | | 9/1977 | Bailey, Jr. et al. |
| 4,839,587 A | | 6/1989 | Flatley et al. |
| 5,034,744 A | | 7/1991 | Obinata |
| 5,210,854 A | | 5/1993 | Beaverton et al. |
| 5,311,395 A | | 5/1994 | McGaha et al. |
| 5,450,354 A | | 9/1995 | Sawada et al. |
| 5,479,638 A | | 12/1995 | Assar et al. |
| 5,784,174 A | | 7/1998 | Fujino et al. |
| 5,790,828 A | * | 8/1998 | Jost .................................. 711/4 |
| 5,930,504 A | | 7/1999 | Gabel |
| 5,949,785 A | | 9/1999 | Beasley |
| 5,963,893 A | | 10/1999 | Sakakura et al. |

(Continued)

FOREIGN PATENT DOCUMENTS

| | | |
|---|---|---|
| EP | 1 956 489 A2 | 8/2008 |
| EP | 1 990 921 A2 | 11/2008 |

(Continued)

OTHER PUBLICATIONS

Tseng et al., "Understanding the Impact of Power Loss on Flash Memory," DAC'11, Jun. 5-10, 2011, San Diego, California, 6 pages.

(Continued)

*Primary Examiner* — Jared Rutz
*Assistant Examiner* — Jean Edouard
(74) *Attorney, Agent, or Firm* — Morgan, Lewis & Bockius LLP

(57) ABSTRACT

A method of operation of a storage control system includes: calculating a throttle threshold; identifying a detection point based on the throttle threshold; and calculating a number of write/erase cycles based on the detection point and the throttle threshold for writing a memory device.

19 Claims, 8 Drawing Sheets

(56) References Cited

U.S. PATENT DOCUMENTS

| | | |
|---|---|---|
| 6,034,897 A | 3/2000 | Estakhri et al. |
| 6,069,827 A | 5/2000 | Sinclair |
| 6,091,652 A | 7/2000 | Haehn et al. |
| 6,275,436 B1 | 8/2001 | Tobita et al. |
| 6,345,367 B1 | 2/2002 | Sinclair |
| 6,356,447 B2 | 3/2002 | Scafidi |
| 6,381,670 B1 | 4/2002 | Lee et al. |
| 6,412,080 B1 | 6/2002 | Fleming et al. |
| 6,529,997 B1 | 3/2003 | Debiez et al. |
| 6,552,581 B1 | 4/2003 | Gabara |
| 6,587,915 B1 | 7/2003 | Kim |
| 6,618,249 B2 | 9/2003 | Fairchild |
| 6,661,503 B1 | 12/2003 | Yamaguchi et al. |
| 6,728,913 B1 | 4/2004 | Parker |
| 6,763,424 B2 | 7/2004 | Conley |
| 6,775,792 B2 | 8/2004 | Ulrich et al. |
| 6,778,387 B2 | 8/2004 | Fairchild |
| 6,850,443 B2 | 2/2005 | Lofgren et al. |
| 6,854,070 B2 | 2/2005 | Johnson et al. |
| 6,871,304 B2 | 3/2005 | Hadjihassan et al. |
| 6,903,972 B2 | 6/2005 | Lasser et al. |
| 6,906,961 B2 | 6/2005 | Eggleston et al. |
| 6,975,028 B1 | 12/2005 | Wayburn et al. |
| 7,082,495 B2 | 7/2006 | DeWhitt et al. |
| 7,107,389 B2 | 9/2006 | Inagaki et al. |
| 7,139,864 B2 | 11/2006 | Bennett et al. |
| 7,233,497 B2 | 6/2007 | Simon et al. |
| 7,243,186 B2 | 7/2007 | Liang et al. |
| 7,298,888 B2 | 11/2007 | Hamar |
| 7,330,927 B1 | 2/2008 | Reeve et al. |
| 7,333,364 B2 | 2/2008 | Yu et al. |
| 7,350,101 B1 | 3/2008 | Nguyen et al. |
| 7,355,896 B2 | 4/2008 | Li et al. |
| 7,434,122 B2 | 10/2008 | Jo |
| 7,441,067 B2 | 10/2008 | Gorobets et al. |
| 7,516,267 B2 | 4/2009 | Coulson et al. |
| 7,613,871 B2 | 11/2009 | Tanaka et al. |
| 7,620,710 B2 * | 11/2009 | Kottomtharayil et al. .... 709/223 |
| 7,620,769 B2 | 11/2009 | Lee et al. |
| 7,639,532 B2 | 12/2009 | Roohparvar et al. |
| 7,661,054 B2 | 2/2010 | Huffman et al. |
| 7,679,948 B2 | 3/2010 | Park et al. |
| 7,693,422 B2 | 4/2010 | Alicherry et al. |
| 7,738,502 B2 | 6/2010 | Chang et al. |
| 7,743,216 B2 | 6/2010 | Lubbers et al. |
| 7,818,525 B1 | 10/2010 | Frost et al. |
| 7,827,348 B2 | 11/2010 | Lee et al. |
| 7,830,164 B2 | 11/2010 | Earle et al. |
| 7,979,614 B1 | 7/2011 | Yang |
| 8,001,135 B2 | 8/2011 | Perlmutter et al. |
| 8,010,738 B1 | 8/2011 | Chilton et al. |
| 8,028,123 B2 | 9/2011 | Kilzer et al. |
| 8,046,645 B2 | 10/2011 | Hsu et al. |
| 8,051,241 B2 | 11/2011 | Feldman et al. |
| 8,072,805 B2 | 12/2011 | Chou et al. |
| 8,095,724 B2 | 1/2012 | Ji et al. |
| 8,095,765 B2 | 1/2012 | Asnaashari et al. |
| 8,117,396 B1 | 2/2012 | Fair et al. |
| 8,127,202 B2 | 2/2012 | Cornwell et al. |
| 8,145,984 B2 | 3/2012 | Sommer et al. |
| 8,154,921 B2 | 4/2012 | Mokhlesi et al. |
| 8,169,825 B1 | 5/2012 | Shalvi et al. |
| 8,205,028 B1 | 6/2012 | Sakarda |
| 8,209,677 B2 | 6/2012 | Shintani et al. |
| 8,219,724 B1 | 7/2012 | Caruso et al. |
| 8,219,776 B2 | 7/2012 | Forhan et al. |
| 8,228,701 B2 | 7/2012 | Sokolov et al. |
| 8,245,101 B2 | 8/2012 | Olbrich et al. |
| 8,250,621 B2 | 8/2012 | Cha |
| 8,254,172 B1 | 8/2012 | Kan |
| 8,259,506 B1 | 9/2012 | Sommer et al. |
| 8,289,801 B2 | 10/2012 | Smith et al. |
| 8,296,534 B1 | 10/2012 | Gupta et al. |
| 8,332,578 B2 | 12/2012 | Frickey, III et al. |
| 8,363,413 B2 | 1/2013 | Paquette et al. |
| 8,369,141 B2 | 2/2013 | Sommer et al. |
| 8,386,700 B2 | 2/2013 | Olbrich et al. |
| 8,386,860 B2 | 2/2013 | Tseng et al. |
| 8,407,409 B2 | 3/2013 | Kawaguchi |
| 8,464,106 B2 | 6/2013 | Filor et al. |
| 8,503,238 B1 | 8/2013 | Wu et al. |
| 8,601,203 B2 | 12/2013 | Holbrook et al. |
| 8,612,669 B1 | 12/2013 | Syu et al. |
| 8,612,804 B1 | 12/2013 | Kang et al. |
| 8,661,184 B2 | 2/2014 | Wood et al. |
| 8,694,811 B2 | 4/2014 | Raju et al. |
| 8,832,506 B2 | 9/2014 | Griffin et al. |
| 8,984,216 B2 | 3/2015 | Fillingim |
| 2002/0056025 A1 | 5/2002 | Qiu et al. |
| 2002/0156891 A1 | 10/2002 | Ulrich et al. |
| 2002/0159285 A1 | 10/2002 | Morley et al. |
| 2003/0033308 A1 | 2/2003 | Patel et al. |
| 2003/0046603 A1 | 3/2003 | Harari et al. |
| 2003/0074592 A1 | 4/2003 | Hasegawa |
| 2003/0163633 A1 | 8/2003 | Aasheim et al. |
| 2004/0080985 A1 | 4/2004 | Chang et al. |
| 2004/0088511 A1 * | 5/2004 | Bacon et al. .................. 711/167 |
| 2004/0252670 A1 | 12/2004 | Rong et al. |
| 2005/0021904 A1 | 1/2005 | Iaculo et al. |
| 2005/0038792 A1 | 2/2005 | Johnson |
| 2005/0073884 A1 | 4/2005 | Gonzalez et al. |
| 2005/0076102 A1 | 4/2005 | Chen et al. |
| 2005/0144516 A1 | 6/2005 | Gonzalez et al. |
| 2006/0015683 A1 | 1/2006 | Ashmore et al. |
| 2006/0020745 A1 | 1/2006 | Conley et al. |
| 2006/0022054 A1 | 2/2006 | Elhamias et al. |
| 2006/0080505 A1 | 4/2006 | Arai et al. |
| 2006/0136682 A1 | 6/2006 | Haridas et al. |
| 2006/0143365 A1 | 6/2006 | Kikuchi |
| 2006/0143475 A1 | 6/2006 | Herbert et al. |
| 2006/0253641 A1 | 11/2006 | Gatzemeier et al. |
| 2006/0256624 A1 | 11/2006 | Eggleston et al. |
| 2006/0282644 A1 | 12/2006 | Wong |
| 2006/0294574 A1 | 12/2006 | Cha |
| 2007/0050536 A1 | 3/2007 | Kolokowsky |
| 2007/0061511 A1 | 3/2007 | Faber |
| 2007/0067598 A1 | 3/2007 | Fujimoto |
| 2007/0079152 A1 | 4/2007 | Winick et al. |
| 2007/0083779 A1 | 4/2007 | Misaka et al. |
| 2007/0226592 A1 | 9/2007 | Radke |
| 2007/0234004 A1 | 10/2007 | Oshima et al. |
| 2007/0260811 A1 | 11/2007 | Merry, Jr. et al. |
| 2007/0263444 A1 | 11/2007 | Gorobets et al. |
| 2007/0276973 A1 | 11/2007 | Tan et al. |
| 2008/0028246 A1 | 1/2008 | Witham |
| 2008/0046630 A1 | 2/2008 | Lasser |
| 2008/0052446 A1 | 2/2008 | Lasser et al. |
| 2008/0082736 A1 | 4/2008 | Chow et al. |
| 2008/0126720 A1 * | 5/2008 | Danilak ........................ 711/158 |
| 2008/0183918 A1 | 7/2008 | Dhokia et al. |
| 2008/0189588 A1 | 8/2008 | Tanaka et al. |
| 2008/0263289 A1 | 10/2008 | Hosoya et al. |
| 2008/0313505 A1 | 12/2008 | Lee et al. |
| 2009/0006900 A1 | 1/2009 | Lastras-Montano et al. |
| 2009/0019321 A1 | 1/2009 | Radke |
| 2009/0070651 A1 | 3/2009 | Diggs et al. |
| 2009/0083587 A1 | 3/2009 | Ng et al. |
| 2009/0089485 A1 | 4/2009 | Yeh |
| 2009/0091990 A1 | 4/2009 | Park et al. |
| 2009/0109786 A1 | 4/2009 | Ye et al. |
| 2009/0125670 A1 | 5/2009 | Keays |
| 2009/0138654 A1 | 5/2009 | Sutardja |
| 2009/0146721 A1 | 6/2009 | Kurooka et al. |
| 2009/0157948 A1 | 6/2009 | Trichina et al. |
| 2009/0164702 A1 | 6/2009 | Kern |
| 2009/0164710 A1 | 6/2009 | Choi et al. |
| 2009/0172262 A1 | 7/2009 | Olbrich et al. |
| 2009/0179707 A1 | 7/2009 | Higashino |
| 2009/0228634 A1 | 9/2009 | Nakamura et al. |
| 2009/0228761 A1 | 9/2009 | Perlmutter et al. |
| 2009/0259819 A1 | 10/2009 | Chen et al. |
| 2009/0259896 A1 | 10/2009 | Hsu et al. |
| 2009/0271562 A1 | 10/2009 | Sinclair |
| 2009/0287975 A1 | 11/2009 | Kim et al. |

(56) References Cited

U.S. PATENT DOCUMENTS

| | | | |
|---|---|---|---|
| 2009/0300238 A1 | 12/2009 | Panabaker et al. |
| 2009/0323419 A1 | 12/2009 | Lee et al. |
| 2009/0327581 A1 | 12/2009 | Coulson |
| 2009/0327591 A1 | 12/2009 | Moshayedi |
| 2010/0017650 A1 | 1/2010 | Chin et al. |
| 2010/0023674 A1 | 1/2010 | Aviles |
| 2010/0050053 A1 | 2/2010 | Wilson et al. |
| 2010/0122019 A1 | 5/2010 | Flynn et al. |
| 2010/0128537 A1 | 5/2010 | Suhail et al. |
| 2010/0138592 A1 | 6/2010 | Cheon |
| 2010/0165689 A1 | 7/2010 | Rotbard et al. |
| 2010/0169541 A1 | 7/2010 | Freikorn |
| 2010/0172179 A1 | 7/2010 | Gorobets et al. |
| 2010/0174845 A1 | 7/2010 | Gorobets et al. |
| 2010/0217898 A1 | 8/2010 | Priborsky et al. |
| 2010/0217915 A1 | 8/2010 | O'Connor et al. |
| 2010/0223531 A1 | 9/2010 | Fukutomi et al. |
| 2010/0228928 A1 | 9/2010 | Asnaashari et al. |
| 2010/0262792 A1 | 10/2010 | Hetzler et al. |
| 2010/0262795 A1 | 10/2010 | Hetzler et al. |
| 2010/0262875 A1 | 10/2010 | Hetzler et al. |
| 2010/0287328 A1* | 11/2010 | Feldman et al. ............ 711/103 |
| 2010/0293367 A1 | 11/2010 | Berke et al. |
| 2010/0312954 A1 | 12/2010 | Jeon et al. |
| 2010/0318719 A1 | 12/2010 | Keays et al. |
| 2010/0332726 A1 | 12/2010 | Wang |
| 2011/0002224 A1* | 1/2011 | Tamura ................... 370/236 |
| 2011/0016239 A1* | 1/2011 | Stenfort ................... 710/34 |
| 2011/0055455 A1 | 3/2011 | Post et al. |
| 2011/0055468 A1 | 3/2011 | Gonzalez et al. |
| 2011/0066788 A1 | 3/2011 | Eleftheriou et al. |
| 2011/0072423 A1 | 3/2011 | Fukata |
| 2011/0078393 A1 | 3/2011 | Lin |
| 2011/0099342 A1 | 4/2011 | Ozdemir |
| 2011/0107144 A1 | 5/2011 | Ohara |
| 2011/0131365 A1 | 6/2011 | Zhang et al. |
| 2011/0131447 A1 | 6/2011 | Prakash et al. |
| 2011/0132000 A1 | 6/2011 | Deane et al. |
| 2011/0138100 A1 | 6/2011 | Sinclair |
| 2011/0145473 A1 | 6/2011 | Maheshwari |
| 2011/0161775 A1 | 6/2011 | Weingarten |
| 2011/0190963 A1 | 8/2011 | Glassl et al. |
| 2011/0191522 A1 | 8/2011 | Condict et al. |
| 2011/0191649 A1 | 8/2011 | Lim et al. |
| 2011/0209032 A1 | 8/2011 | Choi et al. |
| 2011/0238892 A1 | 9/2011 | Tsai et al. |
| 2011/0239088 A1 | 9/2011 | Post |
| 2011/0258496 A1 | 10/2011 | Tseng et al. |
| 2011/0314219 A1 | 12/2011 | Ulrich et al. |
| 2011/0320687 A1 | 12/2011 | Belluomini et al. |
| 2012/0008401 A1 | 1/2012 | Katz et al. |
| 2012/0011336 A1 | 1/2012 | Saika |
| 2012/0047318 A1* | 2/2012 | Yoon et al. ................ 711/103 |
| 2012/0047320 A1 | 2/2012 | Yoo et al. |
| 2012/0047409 A1 | 2/2012 | Post et al. |
| 2012/0066450 A1 | 3/2012 | Yochai et al. |
| 2012/0079348 A1 | 3/2012 | Naeimi |
| 2012/0096217 A1 | 4/2012 | Son et al. |
| 2012/0124046 A1 | 5/2012 | Provenzano |
| 2012/0124273 A1 | 5/2012 | Goss et al. |
| 2012/0151260 A1 | 6/2012 | Zimmermann et al. |
| 2012/0170365 A1 | 7/2012 | Kang et al. |
| 2012/0185706 A1 | 7/2012 | Sistla et al. |
| 2012/0213004 A1 | 8/2012 | Yun et al. |
| 2012/0216085 A1 | 8/2012 | Weingarten et al. |
| 2012/0236656 A1 | 9/2012 | Cometti |
| 2012/0239858 A1 | 9/2012 | Melik-Martirosian |
| 2012/0254686 A1 | 10/2012 | Esumi et al. |
| 2012/0266011 A1 | 10/2012 | Storer et al. |
| 2012/0266048 A1 | 10/2012 | Chung et al. |
| 2012/0278530 A1 | 11/2012 | Ebsen |
| 2012/0278531 A1 | 11/2012 | Horn |
| 2012/0284587 A1 | 11/2012 | Yu et al. |
| 2012/0297113 A1* | 11/2012 | Belluomini et al. ......... 711/103 |
| 2012/0311402 A1 | 12/2012 | Tseng et al. |
| 2012/0317334 A1 | 12/2012 | Suzuki et al. |
| 2012/0324191 A1 | 12/2012 | Strange et al. |
| 2012/0331207 A1 | 12/2012 | Lassa et al. |
| 2013/0007380 A1* | 1/2013 | Seekins et al. ............. 711/154 |
| 2013/0007543 A1 | 1/2013 | Goss et al. |
| 2013/0054881 A1 | 2/2013 | Ellis et al. |
| 2013/0060994 A1 | 3/2013 | Higgins et al. |
| 2013/0061019 A1 | 3/2013 | Fitzpatrick et al. |
| 2013/0073788 A1 | 3/2013 | Post et al. |
| 2013/0080691 A1 | 3/2013 | Weingarten et al. |
| 2013/0094289 A1 | 4/2013 | Sridharan et al. |
| 2013/0100600 A1 | 4/2013 | Yin et al. |
| 2013/0124792 A1 | 5/2013 | Melik-Martirosian et al. |
| 2013/0151753 A1 | 6/2013 | Jeon et al. |
| 2013/0198436 A1 | 8/2013 | Bandic et al. |
| 2013/0232290 A1 | 9/2013 | Ish et al. |
| 2013/0238833 A1 | 9/2013 | Vogan et al. |
| 2013/0265825 A1 | 10/2013 | Lassa |
| 2013/0332791 A1 | 12/2013 | Chu |
| 2014/0036589 A1 | 2/2014 | Parthasarathy et al. |
| 2014/0059359 A1 | 2/2014 | Bahirat |
| 2014/0108891 A1 | 4/2014 | Strasser et al. |
| 2014/0129874 A1 | 5/2014 | Zaltsman et al. |
| 2014/0158525 A1 | 6/2014 | Greene |
| 2014/0181370 A1 | 6/2014 | Cohen et al. |
| 2014/0208174 A1 | 7/2014 | Ellis et al. |
| 2014/0372777 A1 | 12/2014 | Reller et al. |

FOREIGN PATENT DOCUMENTS

| | | |
|---|---|---|
| EP | 2 498 259 A2 | 9/2012 |
| JP | 2012129859 A | 7/2012 |
| WO | WO 2009/042298 A1 | 4/2009 |
| WO | WO 2011/156466 | 12/2011 |

OTHER PUBLICATIONS

Narayanan et al., "Migrating Server Storage to SSDs: Analysis of Tradeoffs," Computer Systems, Apr. 2009, 12 pages.

Shiraz et al., "Block Aging Prevention Technique (BAP) for Flash Based Solid State Disks," 7th International Conference on Emerging Technologies (ICET), Sep. 5, 2011, 6 pages.

Tai et al, "Prolongation of Lifetime and the Evaluation Method of Dependable SSD," 25 International Symposium on Defect and Fault Tolerance in VLSI Systems, 2010, NJ, USA, 8 pages.

Yimo et al., "WeLe-RAID: A SSD-Based RAID for System Endurance and Performance," Jan. 2011, Network and Parallel Computing, Springer, 14 pages.

International Search Report and Written Opinion dated Jan. 9, 2015, received in International Patent Application No. PCT/US2014/049731, which corresponds to U.S. Appl. No. 14/334,324, 9 pages (Fitzpatrick).

International Search Report and Written Opinion dated Feb. 18, 2015, received in International Patent Application No. PCT/US2014/065401, which corresponds to U.S. Appl. No. 14/082,031, 9 pages (Higgins).

International Search Report dated Apr. 15, 2014, received in International Patent Application No. PCT/US2013/078340, which corresponds to U.S. Appl. No. 13/746,542, 11 pages (Ellis).

Cooke, "Introduction to Flash Memory (T1A)," Flash Memory Summit, Aug. 22, 2008, Micron Technology, Inc., 102 pages.

Gai et al., "Algorithms and Data Structures for Flash Memories," ACM Computing Surveys, Jun. 2005, vol. 37, No. 2, 30 pages.

IBM Corporation, "Systems Management, Work Management," Version 5, Release 4, 9th Edition, Feb. 2006, pp. 1-21.

O'Brien, "SMART Storage Systems Optimus SAS Enterprise SSD Review," SMART Storage Systems, Oct. 9, 2012, 44 pages.

Spanjer, "Flash Management—Why and How?" Smart Modular Technologies, Nov. 2009, http://www.scantec.de/fileadmin/pdf/Smart_Modular/Flash-Management.pdf, 14 pages.

Texas Instruments, "Power Management IC For Digital Set Top Boxes," SLVSA10A, Sep. 2009, pp. 1-22.

International Search Report and Written Opinion dated Dec. 20, 2013, received in PCT/US2013/045282, which corresponds to U.S. Appl. No. 13/493,949, 7 pages (Ellis).

(56) References Cited

OTHER PUBLICATIONS

International Search Report and Written Opinion dated Jun. 12, 2014, received in PCT/US2014/018972, which corresponds to U.S. Appl. No. 13/779,352, 12 pages (Schmier).

International Search Report and Written Opinion dated May 14, 2014, received in International Patent Application No. PCT/US2014/017168, which corresponds to U.S. Appl. No. 14/076,115, 6 pages (Fitzpatrick).

International Search Report and Written Opinion dated May 14, 2014, received in International Patent Application No. PCT/US2014/017169, which corresponds to U.S. Appl. No. 14/076,148, 6 pages (Fitzpatrick).

International Search Report and Written Opinion dated Aug. 22, 2014, received in International Patent Application No. PCT/US2014/032978, which corresponds to U.S. Appl. No. 14/081,992, 10 pages (Ellis).

International Search Report and Written Opinion dated Nov. 7, 2014, received in International Patent Application No. PCT/US2014/049732, which corresponds to U.S. Appl. No. 14/334,350, 13 pages (Fitzpatrick).

International Search Report and Written Opinion dated Oct. 17, 2014, received in International Patent Application No. PCT/US2014/049734, which corresponds to U.S. Appl. No. 14/332,259, 8 pages (Higgins).

International Search Report and Written Opinion dated Oct. 23, 2014, received in International Patent Application No. PCT/US2014/049736, which corresponds to U.S. Appl. No. 14/446,249 8 pages (Fitzpatrick).

International Search Report and Written Opinion dated Nov. 5, 2014, received in International Patent Application No. PCT/US2014/049282, which corresponds to U.S Appl. No. 13/957,407, 12 pages (Fitzpatrick).

Ulinktech, "ATA Command Table (in Alphabetic Order)," Feb. 6, 2011, https://web.archive.org/web/20110206060820/http://www.ulinktech.com/downloads/AT, 6 pages.

International Search Report dated Mar. 25, 2014, received in International Patent Application No. PCT/US2013/072400, which corresponds to U.S. Appl. No. 13/690,337, 3 pages (Ellis).

Invitation to Pay Additional Fees dated Jul. 25, 2014, received in International Patent Application No. PCT/US2014/021290, which corresponds to U.S. Appl. No. 13/791,797, 8 pages (Dean).

International Search Report and Written Opinion dated Jul. 31, 2014, received in International Patent Application No. PCT/US2014/031465, which corresponds to U.S. Appl. No. 13/851,928, 13 pages (Ellis).

International Search Report and Written Opinion dated Jul. 31, 2014, received in International Patent Application No. PCT/US2014/033876, which corresponds to U.S. Appl. No. 13/861,326, 9 pages (Fitzpatrick).

* cited by examiner

STORAGE CONTROL SYSTEM WITH DATA MANAGEMENT MECHANISM AND METHOD OF OPERATION THEREOF

TECHNICAL FIELD

The present invention relates generally to a storage control system and more particularly to a system for data management.

BACKGROUND ART

Data storage, often called storage or memory, refers to computer components and recording media that retain digital data. Data storage is a core function and fundamental component of consumer and industrial electronics, especially devices such as computers, televisions, cellular phones, mobile devices, and digital video cameras.

Recently, forms of long-term storage other than electromechanical hard disks have become feasible for use in computers. NOT-AND (NAND) flash is one form of non-volatile memory used in solid-state storage devices. The memory cells are arranged in typical row and column fashion with circuitry for accessing individual cells. The memory transistors of those cells are placed to store an analog value that can be interpreted to hold two logical states in the case of Single Level Cell (SLC) or more than two logical states in the case of Multi Level Cell (MLC).

A flash memory cell is light in weight, occupies very little space, and consumes less power than electromechanical disk drives. Construction of a storage system with this type of memory allows for much higher bandwidths and input/output operations per second (IOPS) than typical electromechanical disk drives. More importantly, it is especially rugged and can operate at a much high temperature range. It will withstand without adverse effects repeated drops, each of which would destroy a typical electromechanical hard disk drive. A problem exhibited by flash memory is that it tends to have a limited life in use.

Thus, a need still remains for better data management devices. In view of the increasing demand for data management devices, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a storage control system, including: calculating a throttle threshold; identifying a detection point based on the throttle threshold; and calculating a number of write/erase cycles based on the detection point and the throttle threshold for writing a memory device.

The present invention provides a storage control system, including: a threshold calculation module for calculating a throttle threshold; a threshold comparison module, coupled to the threshold calculation module, for identifying a detection point based on the throttle threshold; and an operation update module, coupled to the threshold comparison module, for calculating a number of write/erase cycles based on the detection point and the throttle threshold for writing a memory device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
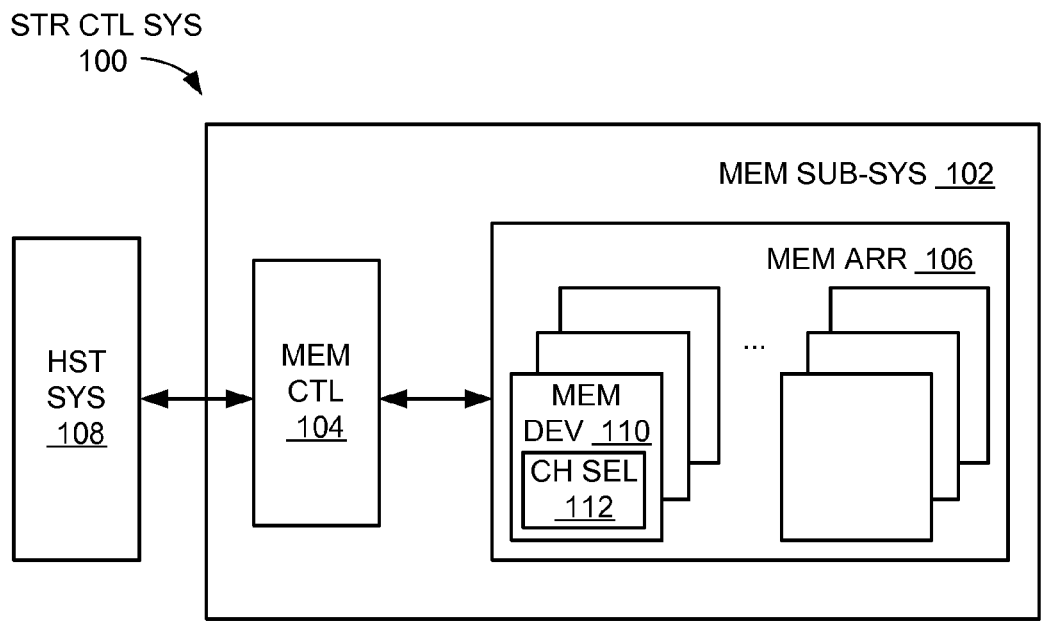
FIG. 1 is a storage control system with data management mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs.

Where multiple embodiments are disclosed and described having some features in common, for clarity and ease of illustration, description, and comprehension thereof, similar and like features one to another will ordinarily be described with similar reference numerals. The embodiments have been numbered first embodiment, second embodiment, etc. as a matter of descriptive convenience and are not intended to have any other significance or provide limitations for the present invention.

The term "module" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a microelectromechanical system (MEMS), passive devices, environmental sensors including temperature sensors, or a combination thereof.

Referring now to FIG. 1, therein is shown a storage control system 100 with data management mechanism in an embodiment of the present invention. The storage control system 100 includes a memory sub-system 102 having a memory controller 104 and a memory array 106. The storage control system 100 includes a host system 108 communicating with the memory sub-system 102.

The memory controller 104 provides data control and management of the memory array 106. The memory controller 104 interfaces with the host system 108 and controls the memory array 106 to transfer data between the host system 108 and the memory array 106.

The memory array 106 includes an array of memory devices 110 including flash memory devices or non-volatile memory devices. The memory array 106 can include pages of data or information. The host system 108 can request the memory controller 104 for reading, writing, and deleting data from or to a logical address space of a storage device or the memory sub-system 102 that includes the memory array 106.

The memory devices 110 can include chip selects 112, which are defined as control inputs, for enabling the memory devices 110. Each of the chip selects 112 can be used to control the operation of one of the memory devices 110. Each of the chip selects 112 can be used to control sub addresses or logical units (LUNs) within each of the memory devices 110. When the chip selects 112 are enabled, the memory devices 110 are in active state for operation including reading, writing, or erasing.

Figure 2:
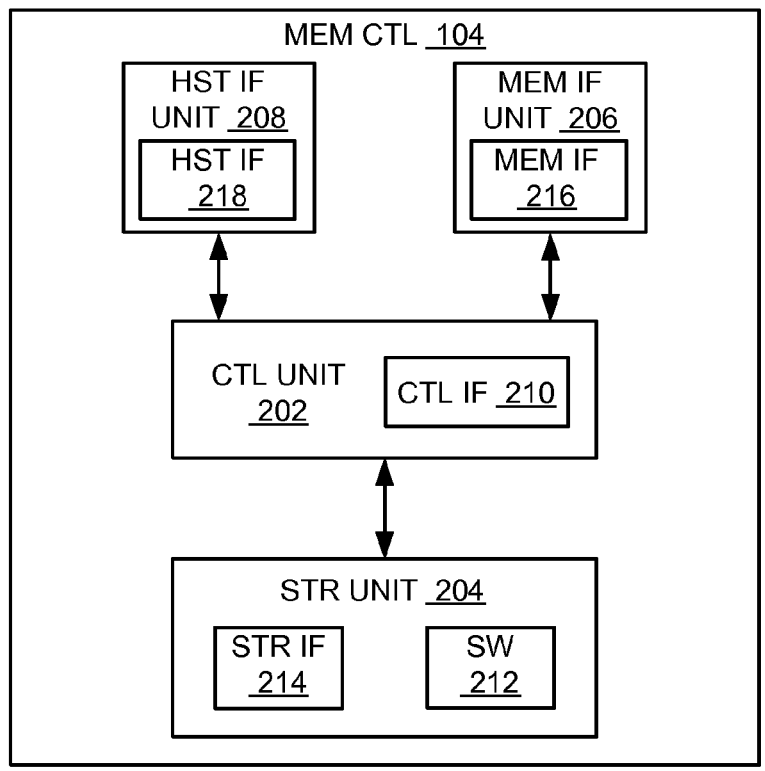
FIG. 2 is an exemplary hardware block diagram of the memory controller.

Referring now to FIG. 2, therein is shown an exemplary hardware block diagram of the memory controller 104. The memory controller 104 can include a control unit 202, a storage unit 204, a memory interface unit 206, and a host interface unit 208. The control unit 202 can include a control interface 210. The control unit 202 can execute software 212 stored in the storage unit 204 to provide the intelligence of the memory controller 104.

The control unit 202 can be implemented in a number of different manners. For example, the control unit 202 can be a processor, an embedded processor, a microprocessor, a hardware control logic, a hardware finite state machine (FSM), a digital signal processor (DSP), or a combination thereof.

The control interface 210 can be used for communication between the control unit 202 and other functional units in the memory controller 104. The control interface 210 can also be used for communication that is external to the memory controller 104.

The control interface 210 can receive information from the other functional units or from external sources, or can transmit information to the other functional units or to external destinations. The external sources and the external destinations refer to sources and destinations external to the memory controller 104.

The control interface 210 can be implemented in different ways and can include different implementations depending on which functional units or external units are being interfaced with the control interface 210. For example, the control interface 210 can be implemented with a dedicated hardware including an application-specific integrated circuit (ASIC), a configurable hardware including a field-programmable gate array (FPGA), a discrete electronic hardware, or a combination thereof.

The storage unit 204 can include both hardware and the software 212. For example, the software 212 can include control firmware. The storage unit 204 can include a volatile memory, a nonvolatile memory, an internal memory, an external memory, or a combination thereof. For example, the storage unit 204 can be a nonvolatile storage such as non-volatile random access memory (NVRAM), Flash memory, disk storage, or a volatile storage such as static random access memory (SRAM).

The storage unit 204 can include a storage interface 214. The storage interface 214 can also be used for communication that is external to the memory controller 104. The storage interface 214 can receive information from the other functional units or from external sources, or can transmit information to the other functional units or to external destinations. The external sources and the external destinations refer to sources and destinations external to the memory controller 104.

The storage interface 214 can include different implementations depending on which functional units or external units are being interfaced with the storage unit 204. The storage interface 214 can be implemented with technologies and techniques similar to the implementation of the control interface 210.

The memory interface unit 206 can enable external communication to and from the memory controller 104. For example, the memory interface unit 206 can permit the memory controller 104 to communicate with the memory array 106 of FIG. 1.

The memory interface unit 206 can include a memory interface 216. The memory interface 216 can be used for communication between the memory interface unit 206 and other functional units in the memory controller 104. The memory interface 216 can receive information from the other functional units or can transmit information to the other functional units.

The memory interface 216 can include different implementations depending on which functional units are being interfaced with the memory interface unit 206. The memory interface 216 can be implemented with technologies and techniques similar to the implementation of the control interface 210.

The host interface unit 208 allows the host system 108 of FIG. 1 to interface and interact with the memory controller 104. The host interface unit 208 can include a host interface 218 to provide communication mechanism between the host interface unit 208 and the host system 108.

The control unit 202 can operate the host interface unit 208 to send control or status information generated by the memory controller 104 to the host system 108. The control unit 202 can also execute the software 212 for the other functions of the memory controller 104. The control unit 202 can further execute the software 212 for interaction with the memory array 106 via the memory interface unit 206.

The functional units in the memory controller 104 can work individually and independently of the other functional units. For illustrative purposes, the memory controller 104 is described by operation of the memory controller 104 with the host system 108 and the memory array 106. It is understood that the memory controller 104, the host system 108, and the memory array 106 can operate any of the modules and functions of the memory controller 104.

Figure 3:
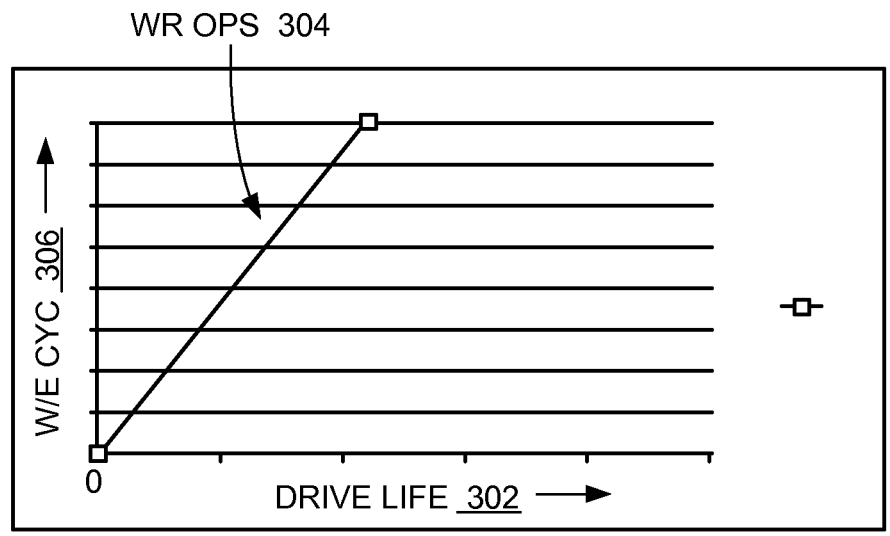
FIG. 3 is a first example graph of a drive life without life throttling.

Referring now to FIG. 3, therein is shown a first example graph of a drive life 302 without life throttling. The drive life 302 is defined as a period of time when the memory subsystem 102 of FIG. 1 is available for the host system 108 of FIG. 1 to access.

The term "throttling" refers to a process of limiting operations at a physical interface of the memory devices 110 of FIG. 1. The limiting of the operations can be performed to achieve a desired predetermined goal. The limiting of the operations at the physical interface can result in a corresponding limit at a host interface of the memory sub-system 102 to the host system 108.

The life throttling limits a number of write operations 304, each of which is defined as a single program operation on a memory cell in the memory devices 110. For example, the memory cell can be a NAND cell. Also for example, the write operations 304 can be program operations.

Each of the write operations 304 can be a write (or a program command) to one or more pages within an erase block. The program does not imply an erase cycle. Each of the pages is the smallest addressable unit for read and program (or write) operations. The erase block is the smallest addressable unit for an erase operation in the memory devices 110.

The life throttling can limit the write operations 304 at a physical level including a level at the memory devices 110 in order to guarantee that the memory sub-system 102 can meet a target number of write/erase cycles 306 at a particular operational lifetime. For example, the memory sub-system 102 can be a storage drive. Each of the write/erase cycles 306 is defined as a base level operation of how data is replaced within the erase block. For example, the write/erase cycles 306 can be program/erase (P/E) cycles.

While the data can be read/programmed a page at a time, it can only be erased a "block" at a time. Thus, each of the write/erase cycles 306 can frequently include multiple of the write operations 304 followed by a single erase operation. The memory devices 110 can have a limited number of the write/erase cycles 306 that are useful because each of the write/erase cycles 306 can cause a small amount of physical damage to the medium.

Without an ability to throttle the write operations 304, the memory sub-system 102 could be operated at a maximum write performance possibly for an extended duration resulting in the memory devices 110 becoming worn out. The memory sub-system 102 can become worn out prior to a desired predetermined value of the drive life 302 during an operation of the memory sub-system 102. For example, FIG. 3 can represent the memory devices 110 of the memory sub-system 102 becoming worn out after 40,000 of the write/erase cycles 306 performed in 2.2 years, whereas the drive life 302 is expected to be 5 years.

Limiting the write operations 304 at the physical level rather than simply restricting bandwidth on the host interface allows for all the write operations 304 to be throttled and removes the need to include effects of write amplification in the calculations. The write amplification refers to a ratio of physically written data to the memory devices 110 divided by host write data from the host system 108 written to the memory devices 110.

Figure 4:
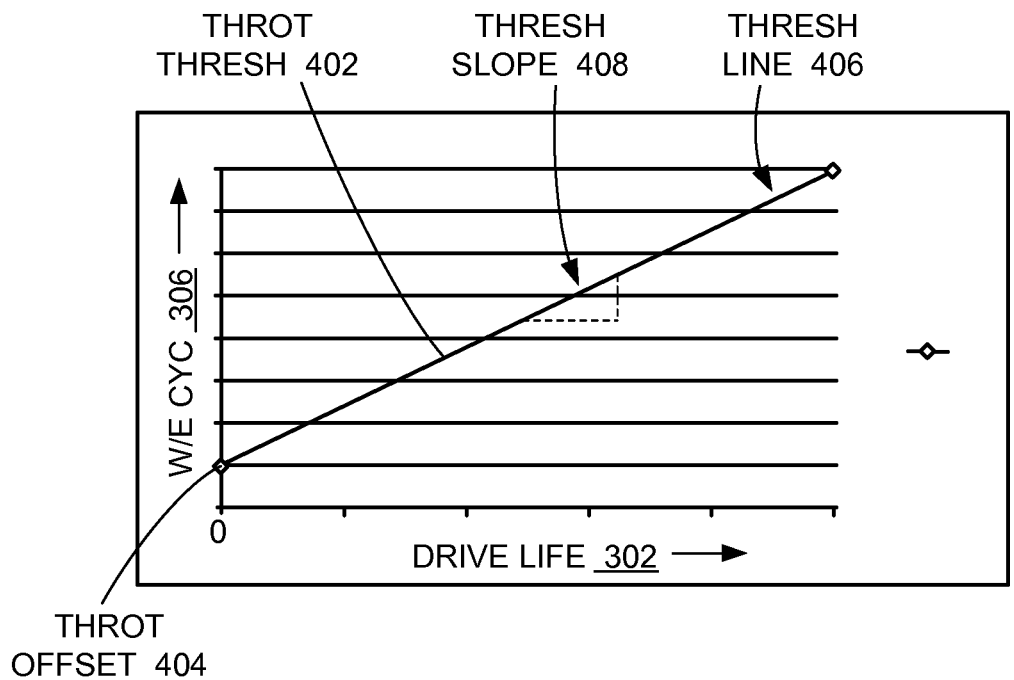
FIG. 4 is a second example graph of a threshold line used to determine when to throttle the write operations of FIG. 3.

Referring now to FIG. 4, therein is shown a second example graph of a threshold line 406 used to determine when to throttle the write operations 304 of FIG. 3. FIG. 4 depicts a throttle threshold 402, which is defined as a numerical value for determining whether to throttle the write operations 304.

For example, the throttle threshold 402 can be graphed using a line that exists between two Cartesian coordinate points, where the write/erase cycles 306 and the drive life 302 are on the y-axis and the x-axis, respectively. As an example, the write/erase cycles 306 can be expressed in a number of the P/E cycles. As another example, the drive life 302 can be expressed in a number of days or years.

The throttle threshold 402 can be at a threshold offset 404 at the beginning of the drive life 302. The threshold offset 404 is defined as a minimum number of the write/erase cycles 306 at the beginning of the drive life 302. The beginning of the drive life 302 is when the drive life 302 is 0. For example, the threshold offset 404 can be an initial P/E cycle offset.

The threshold offset 404 can be a minimum P/E cycle offset used at the beginning of the drive life 302 of the memory sub-system 102 of FIG. 1. The threshold offset 404 can be determined in order to introduce a period during which a write performance is not throttled. For example, the threshold offset 404 can be 5,000 P/E cycles when the drive life 302 is 0. Also for example, the write/erase cycles 306 can be 40,000 P/E cycles when the drive life 302 is 5 years.

FIG. 4 depicts the threshold line 406, which is used to determine when to throttle the write operations 304. For example, the threshold line 406 can be a life throttle threshold line. By feeding a threshold slope 408 of the threshold line 406 and the threshold offset 404 at the beginning of the drive life 302 into a slope-intercept straight-line equation, a current value of the throttle threshold 402 in number of the write/erase cycles 306 can be obtained. The slope-intercept straight-line equation is y=mx+b, where y is a function of x and is plotted on the y-axis, m is a slope, x is a variable on the x-axis, and b is the threshold offset 404 as the y-intercept.

Figure 5:
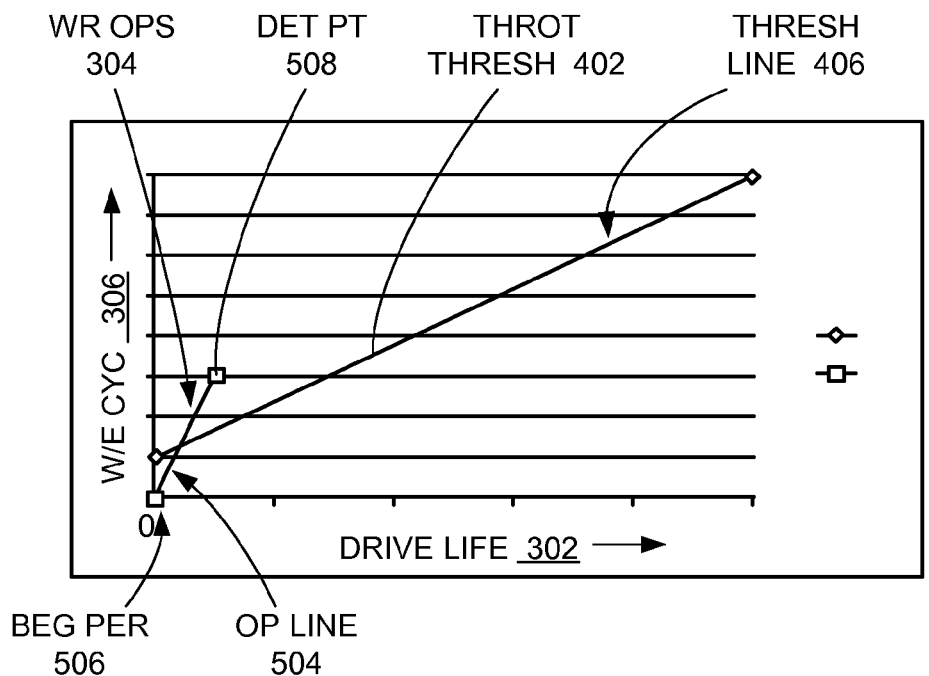
FIG. 5 is a third example graph of an operation line exceeding the threshold line.

Referring now to FIG. 5, therein is shown a third example graph of an operation line 504 exceeding the threshold line 406. The operation line 504 represents a number of the write/erase cycles 306 that have occurred. For example, the operation line 504 can indicate a number of drive writes. The operation line 504 indicates that the write/erase cycles 306 are performed without the life throttling during a beginning period 506. The beginning period 506 is defined as a period, at the beginning of operation of the memory sub-system 102 of FIG. 1, during which the memory sub-system 102 operates without the life throttling.

The life throttling can be performed after the operation line 504 crosses over the threshold line 406 at a detection point 508 in FIG. 5. The detection point 508 is defined as a specific point in a Cartesian coordinate system at which the number of the write/erase cycles 306 is determined as greater than or equal to the throttle threshold 402. The detection point 508 can be identified by a pair of coordinates corresponding to the drive life 302 and the write/erase cycles 306. For example, the detection point 508 can be at a pair of coordinates (0.5, 15000) corresponding to the drive life 302 of 0.5 year and the number of the write/erase cycles 306 equals to 15,000 P/E cycles.

The life throttling of the write operations 304 can be initiated when the detection point 508 is detected. The life throttling of the write operations 304 can be initiated after the number of the write/erase cycles 306 in the memory sub-system 102 exceeds the throttle threshold 402 at a current or specific value of the drive life 302. For example, the drive life 302 can represent an age of the memory sub-system 102, where the age is a total number of the P/E cycles per a predetermined unit of time.

A periodic calculation performed by the memory controller 104 of FIG. 1 can determine if the number of the write/erase cycles 306 of the memory sub-system 102 is over the throttle threshold 402. If the number of the write/erase cycles 306 is found or compared to be over the throttle threshold 402, the life throttling can be engaged. In this case, the life throttling can continue until the number of the write/erase cycles 306, for the current value of the drive life 302, is once again below the throttle threshold 402. The life throttling can continue until the end of the lifetime of the memory sub-system 102.

No throttling can be imposed on the write operations 304 if the memory sub-system 102 is operating below the throttle threshold 402. In other words, the life throttling is not performed when the number of the write/erase cycles 306 is below the throttle threshold 402. For example, the life throttling can be write throttling of the write operations 304. Also for example, the throttle threshold 402 can represent a life throttle threshold.

If a current count or the number of the write/erase cycles 306 is greater than the throttle threshold 402 at any point in the drive life 302 as an operational lifetime of the memory sub-system 102, the life throttling can be performed. FIG. 5 is an exaggerated example intended to show the operation line 504 crossing over the threshold line 406. For example, the operation line 504 can be from coordinate points (0,0) and (0.5, 15000), where each of the coordinate points is a pair of coordinates corresponding to the drive life 302 and the number of the write/erase cycles 306.

As an example, subsequent figures do not portray or depict a regular interval that the life throttling is updated in order simplify graphs in the subsequent figures and introduce a throttling methodology. The subsequent figures also assume that the memory sub-system 102 is operated at the maximum write performance allowed for the duration of its life.

Figure 6:
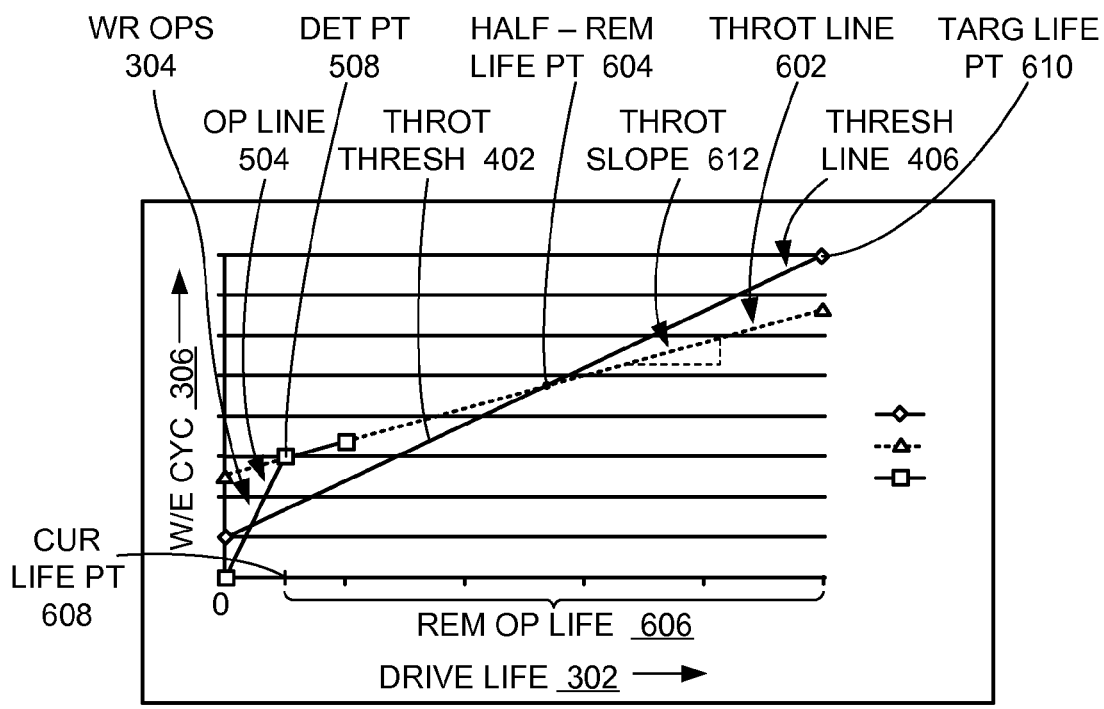
FIG. 6 is a fourth example graph of the write operations limited by the life throttling.

Referring now to FIG. 6, therein is shown a fourth example graph of the write operations 304 limited by the life throttling. FIG. 6 depicts the operation line 504 crossing over the threshold line 406.

The operation line 504 crossing over the threshold line 406 indicates that the number of the write/erase cycles 306 exceeds the throttle threshold 402. Once the throttle threshold 402 is exceeded by the number of the write/erase cycles 306, a throttle line 602 can be plotted. The throttle line 602 can be plotted between and with the detection point 508 currently on the operation line 504 of the graph of the memory sub-system 102 of FIG. 1 and a half-remaining life point 604 on the threshold line 406.

The half-remaining life point 604 is defined as a point in a Cartesian coordinate system that indicates half of a remaining operational life 606 of the memory sub-system 102. The remaining operational life 606 is defined as a period from a current life point 608 to a target life point 610.

For example, the write operations 304 can be throttled to a target with a number of the write/erase cycles 306 per day of the memory sub-system 102 converge at a point corresponding to the half-remaining life point 604. Also for example, the half-remaining life point 604 can be half of remaining expected drive life.

The current life point 608 is defined as a numerical value of time that indicates how long the memory sub-system 102 has been in operation. The current life point 608 can be a current operating point of the memory sub-system 102. The target life point 610 is defined as a numerical value that indicates a time beyond which the memory sub-system 102 is predetermined or projected to be no longer operational. The target life point 610 can be an end of life target of the memory sub-system 102, although it is understood that the drive life 302 of the memory sub-system 102 can be greater than the target life point 610.

A throttle slope 612 of the throttle line 602 can be calculated and used to throttle the write operations 304 as shown in FIG. 6. For example, the throttle slope 612 can be in terms of P/E cycles per day. Also for example, the throttle slope 612, in terms of a number of the write/erase cycles 306 per day, can be converted into a rate in terms of flash pages per second because this value is of more use when performing NAND operations at the physical level. In the remaining operational life 606, the number of the write/erase cycles 306 can be determined based on the throttle slope 612 of the throttle line 602.

Figure 7:
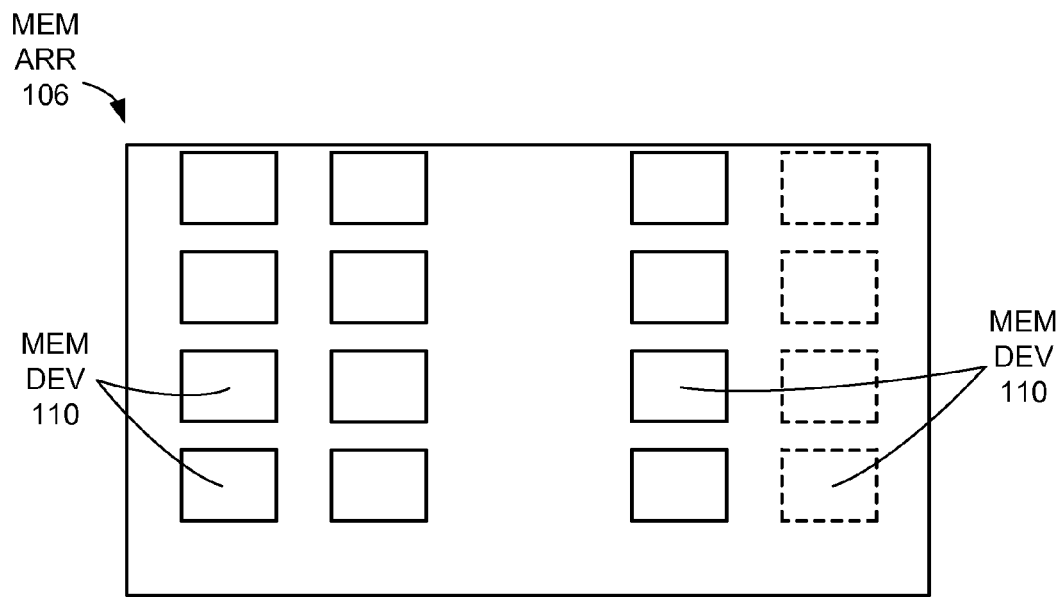
FIG. 7 is an example diagram of the memory array with the life throttling.

Referring now to FIG. 7, therein is shown an example diagram of the memory array 106 with the life throttling. FIG. 7 can represent a possible throttling implementation. The write operations 304 of FIG. 3 can be limited so that the memory sub-system 102 of FIG. 1 does not exceed a new rate determined by the life throttling.

The left side of FIG. 7 depicts the maximum write performance through all the memory devices 110 being available for use. The write operations 304 can be limited possibly by artificially reducing a number of the memory devices 110 that are available, as shown on the right side of FIG. 7. Data can be written to any number of the memory devices 110 in a parallel manner to increase the bandwidth as well as performance of the memory sub-system 102. The memory devices 110 can represent or include a number of dies, each of which is the minimum unit that independently executes commands and reports status.

The right side of FIG. 7 depicts a throttled write performance through artificially limiting of availability of the memory devices 110. For example, only half of the number of the memory devices 110 can be used to achieve the write performance throttled through artificial limiting of die availability.

Figure 8:
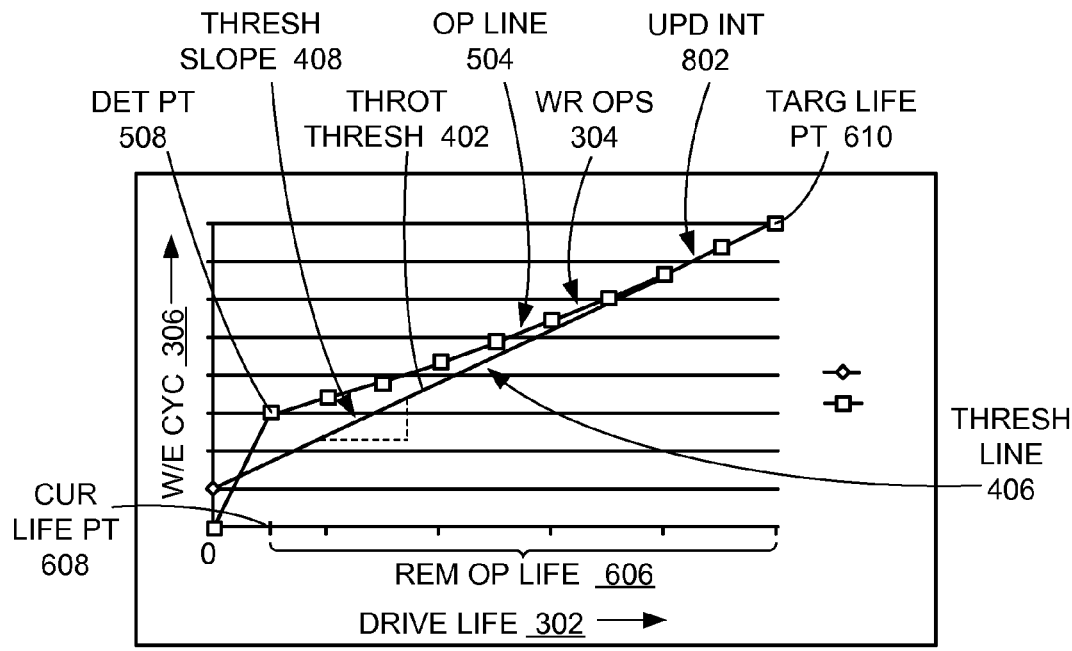
FIG. 8 is a fifth example graph of the operation line converging with the threshold line.

Referring now to FIG. 8, therein is shown a fifth example graph of the operation line 504 converging with the threshold line 406. By limiting the write operations 304, a number of the write/erase cycles 306 per day of the memory sub-system 102 of FIG. 1 can converge with the throttle threshold 402 as depicted by FIG. 8.

The number of the write/erase cycles 306 to be performed can be periodically determined. The number of the write/erase cycles 306 can be periodically determined by re-calculating the number of the write/erase cycles 306 at an update interval 802, which is defined as a predetermined constant period. After the update interval 802, a total number of the write/erase cycles 306 to be performed can be calculated based on the throttle line 602 of FIG. 6. For example, the update interval 802 can be any period including 0.5 year.

The number of the write/erase cycles 306 can be re-calculated using a process of periodically calculating the throttle line 602. The process of periodically calculating the throttle line 602 can result in a gentle or small curve to the write/erase cycles 306 of the memory sub-system 102 in terms of number of the P/E cycles. After the detection point 508, the number of the write/erase cycles 306 as a function of the drive life 302 can be plotted as a concave curve for the remaining operational life 606.

In the remaining operational life 606, the number of the write/erase cycles 306 can converge with the throttle threshold 402. The number of the write/erase cycles 306 can converge with the throttle threshold 402 because the throttle slope 612 of FIG. 6 is gradually increasing. The throttle slope 612 can increase as it approaches the threshold slope 408 of the threshold line 406 due to the throttling of the write operations 304 becoming more relaxed as the number of the write/erase cycles 306 converges with the threshold line 406. The throttle slope 612 can increase by reducing a current number of the write/erase cycles 306 count after the update interval 802 and shifting of a point on the threshold line 406 corresponding with the half-remaining life point 604 of FIG. 6 of the memory sub-system 102.

If the current life point 608 of the memory sub-system 102 is at the update interval 802 just prior to the target life point 610, the number of the write/erase cycles 306 to be performed at the target life point 610 can be calculated as the y-axis value of the threshold line 406 at the target life point 610. The target life point 610 can be an end of life target of the memory sub-system 102.

If the current life point 608 of the memory sub-system 102 is at or beyond the target life point 610, the threshold slope 408 of the threshold line 406 can be used for the life throttling. The threshold slope 408 can also serve as a floor so that throttling of the write operations 304 to zero is not used, as it would cease all the write operations 304. In this case, the total number of the write/erase cycles 306 can be calculated as a sum of the current value of the write/erase cycles 306 and a product of the update interval 802 and the threshold slope 408. The total number of the write/erase cycles 306 can also be calculated as the y-axis value of the threshold line 406 at the update interval 802 after the current life point 608.

The write performance can be throttled at the physical level, as previously described in FIG. 7, so that write amplification does not need to be taken into account. This provides flexibility in balancing a mix of host write operations and recycle write operations.

In the preceding figures, it can be assumed that the memory sub-system 102 is operated at the maximum write performance allowed for duration of its life. Therefore, the memory sub-system 102 can be constantly up against a rate limit imposed by the life throttling using the threshold line 406.

Because short, random bursts of write activity often follow longer periods of inactivity or read-only activity, the life throttling can allow the host system 108 of FIG. 1 to generate a large amount of write activity with minimal throttling in these short, random bursts. To achieve this, the life throttling for the write activity from the host system 108 can employ a credit scheme for allowing the short, random bursts of the write activity to be potentially uninhibited by throttling mechanisms even though the life throttling for the write activity is engaged.

When the life throttling is active, the write operations 304 to the memory devices 110 of FIG. 1 can be limited by a rate in terms of the flash pages per second. In periods where the write operations 304 are not occurring, credits in terms of the flash pages per second can be accumulated. When a burst of the write activity from the host system 108 occurs, the write operations 304 can be performed uninhibitedly or continuously until the credits are exhausted, at which time the write operations 304 can be limited by a current throttling rate based on the throttle line 602.

A method with the credits can allow the short, random bursts of the write activity to exceed the current throttling rate if the credits are available. With this method, a rate of flash writes averaged over a period in which the credits were accumulated and consumed can be equivalent to an imposed throttling rate based on the throttle threshold 402. In this scheme, a slope of the operation line 504 depicting the write operations 304 between the calculation intervals in FIG. 8 can effectively become a ceiling.

Figure 9:
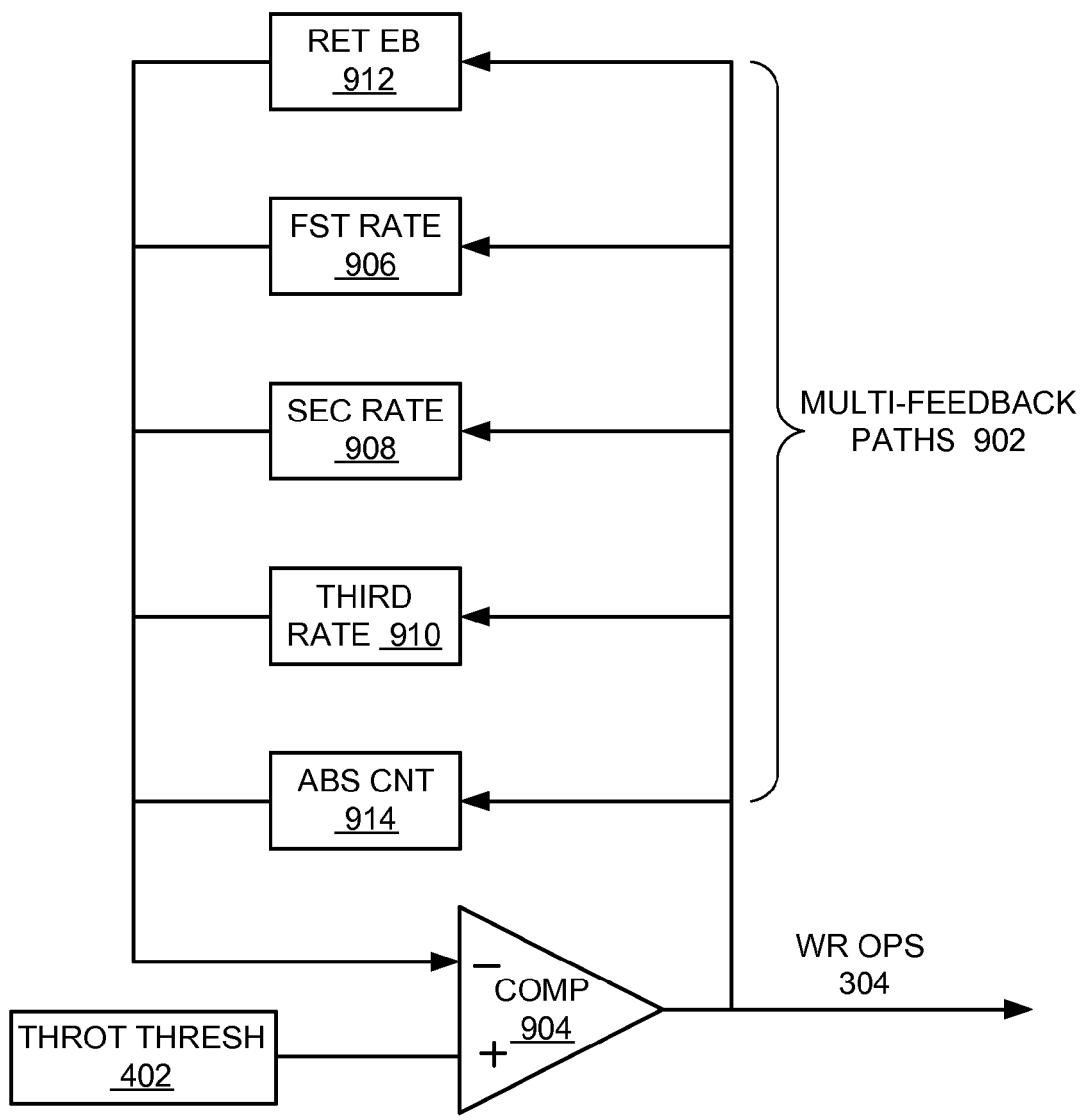
FIG. 9 is a functional block diagram of the life throttling with multi-feedback paths.

Referring now to FIG. 9, therein is shown a functional block diagram of the life throttling with multi-feedback paths 902. FIG. 9 depicts a comparator 904, which compares the number of the write/erase cycles 306 of FIG. 3 to the throttle threshold 402. The comparator 904 can be implemented in the memory controller 104 of FIG. 1. The multi-feedback paths 902 are defined as paths for data to be processed from an output of the comparator 904 and fed back to an input of the comparator 904.

The number of the write/erase cycles 306 can be based on information from a number of the multi-feedback paths 902. The throttle threshold 402 can provide a threshold level for limiting the number of the write operations 304. By feeding back the amount of throttle being applied from the output of the comparator 904, each of the boxes in the multi-feedback paths 902 can utilize this information to decide if adjustments to the throttling are necessary.

As an example, the life throttling can use an approach with the multi-feedback paths 902 to limit the number of the write operations 304 that are active over differing periods. The differing periods can include a number of various time units including a first rate 906, a second rate 908, and a third rate 910. The first rate 906, the second rate 908, and the third rate 910 are defined as predetermined units of time.

The first rate 906, the second rate 908, and the third rate 910, denoted as RATE(A), RATE(B), and RATE(C), respectively, can be periods that are different from each other. RATE (A), RATE(B), and RATE(C) can be used for operations that are programmed per unit time A, B, and C, respectively. For example, the first rate 906, the second rate 908, and the third rate 910 can be associated with hours, days, and weeks, respectively.

In addition to sampling of the write operations 304 per unit time based on the first rate 906, the second rate 908, and the third rate 910, information from the multi-feedback paths 902 can include a number of retired erase blocks 912 that have been retired or put into a runtime defect list. The life throttling can take into account a speed at which erase blocks are retired.

FIG. 9 illustrates a system with the multi-feedback paths 902 of controlling an active number of the write operations 304 for the life throttling. The multi-feedback paths 902 that provide information associated with RATE(A), RATE(B), and RATE(C) can be used for measurements of the number of the write operations 304 averaged over different periods. As the number of the write operations 304 that are active is higher than the throttle threshold 402 over longer periods, more throttling can be applied.

In addition to rates provided by RATE(A), RATE(B), and RATE(C), an absolute count 914 of the write/erase cycles 306 can be provided by the multi-feedback paths 902. The absolute count 914 is defined as a total number of writes that the memory sub-system 102 of FIG. 1 has executed over its life. For example, the absolute count 914 can represent an absolute count of P/E cycles that have been performed. The absolute count 914 can be used to assess the life throttling.

Figure 10:
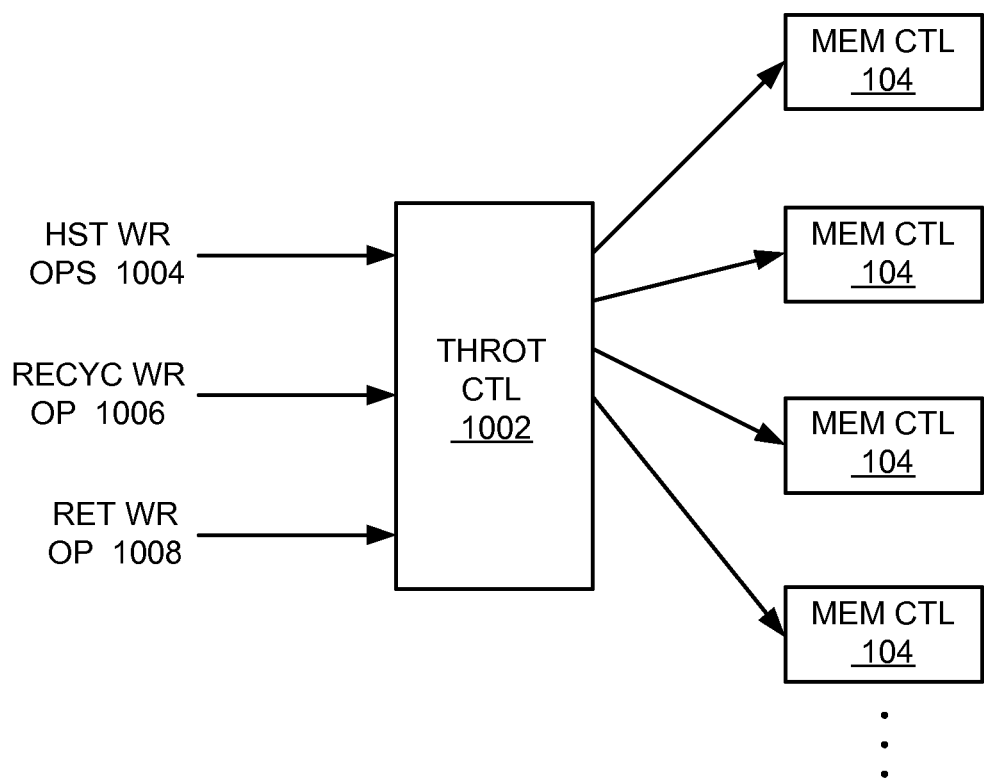
FIG. 10 is another functional block diagram of the life throttling in the memory sub-system of FIG. 1.

Referring now to FIG. 10, therein is shown another functional block diagram of the life throttling in the memory sub-system 102 of FIG. 1. FIG. 10 depicts the life throttling for a number of the memory controller 104. For example, the memory controller 104 can represent a flash controller.

FIG. 10 depicts a throttle controller 1002 to provide control and management of write data to be sent to the number of the memory controller 104. The write data can be subsequently written to the memory devices 110 of FIG. 1 of the memory array 106 of FIG. 1 that is interfaced to one of the number of the memory controller 104. The write data can be subsequently written to any number of the memory controller 104 in a parallel manner to increase the bandwidth as well as performance of the memory sub-system 102.

The data from the host system 108 of FIG. 1 can include host write operations 1004, recycle write operations 1006, and retention write operations 1008, as examples. The host write operations 1004 are defined as accesses to the memory sub-system 102 to store data from the host system 108. For example, the host write operations 1004 can be associated with a physical write of data from the host system 108 to a particular logical address range. The term "physical write" refers to a write that goes to the memory devices 110, each of which is an end storage element including a NAND flash device.

The recycle write operations 1006 are defined as accesses to the memory sub-system 102 to move data in the memory sub-system 102 due to recycling. The term "recycling" refers to moving data from one of the pages to another of the pages for purposes of either freeing up the erase blocks to write new data from the host system 108 or to ensure that data in the erase blocks is preserved.

The retention write operations 1008 are defined as accesses to the memory sub-system 102 to re-write data that has been stored in the memory sub-system 102 for a given or predetermined period. The given or predetermined period refers to a time that is independent of whether the storage control system 100 of FIG. 1 is powered on or powered off. The term "retention" refers to an ability of memory cells in the memory devices 110 to retain programmed or correct information.

The life throttling can be performed by the throttle controller 1002 by limiting a subset of the number of the memory controller 104 available for writing the host write operations 1004, the recycle write operations 1006, and the retention write operations 1008, or a combination thereof. For example, the throttle controller 1002 can represent a physical write throttle controller.

Figure 11:
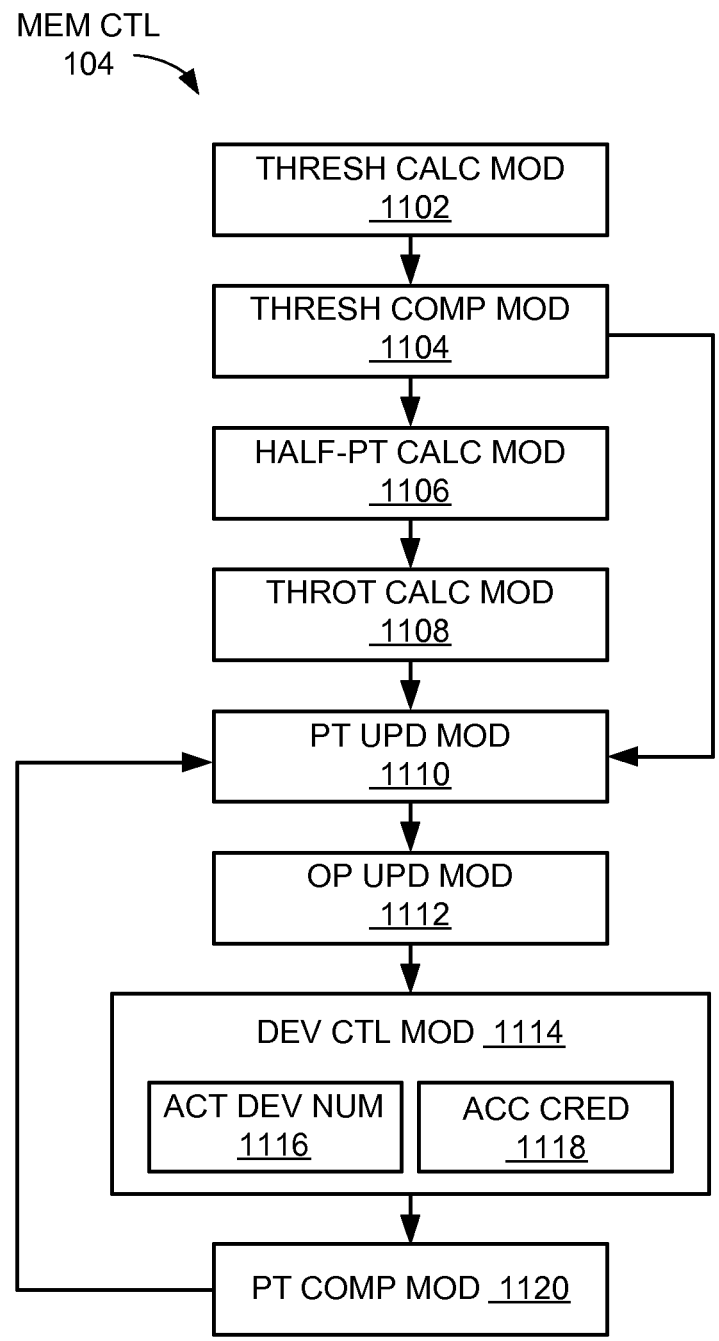
FIG. 11 is a control flow of the memory controller.

Referring now to FIG. 11, therein is shown a control flow of the memory controller 104. The life throttling can work or perform by limiting the write operations 304 of FIG. 3 at the physical level in order to guarantee that the memory sub-system 102 of FIG. 1 can meet a target number of the write/erase cycles 306 of FIG. 3 at a particular operational lifetime. Therefore, the life throttling can contribute to the ability of the memory sub-system 102 to operate at 10 full capacity writes per day for a period of five years.

The memory controller 104 provides the throttle line 602 of FIG. 6 as a limit that adjusts over time to allow for both potential variability of host write requirements and long-term viability of the memory devices 110 of FIG. 1 in the memory sub-system 102. The memory controller 104 provides an efficient method of performing the life throttling that has no impact on normal drive operations. The concept in the memory controller 104 of employing the life throttling can be used in a solid-state drive (SSD). This concept can also be retrofitted into any SSD products with a design that needs a process to extend the operational lifetime of a drive.

The underlying idea is that the memory controller 104 can track a current value of the write/erase cycles 306 of the memory sub-system 102 and compare the current value with an expected value using the throttle threshold 402 of FIG. 4. For example, the current value, the expected value, and the throttle rate can be in program/erase (P/E) cycles.

Then, if necessary, the memory controller 104 can calculate a throttle rate in the write/erase cycles 306 using the throttle line 602 and convert the throttle rate into an equivalent number of the write operations 304 per a predetermined unit time. Finally, the memory controller 104 can limit the number of the write operations 304 in order to reduce the number of the write/erase cycles 306.

The memory controller 104 can include a threshold calculation module 1102 to determine the throttle threshold 402 of FIG. 4. A process of the life throttling can begin with the threshold calculation module 1102. The threshold calculation module 1102 can determine the throttle threshold 402 based on the threshold line 406 of FIG. 4. The throttle threshold 402 can be determined by the slope-intercept straight-line equation of the threshold line 406.

The throttle threshold 402 can be implemented as a function of the threshold slope 408 of FIG. 4, the drive life 302 of FIG. 3, and the threshold offset 404 of FIG. 4. The throttle threshold 402 can be calculated as y=mx+b, where y is the throttle threshold 402 on the y-axis, m is the threshold slope 408, x is the drive life 302 on the x-axis, and b is the threshold offset 404 as the y-intercept.

The memory controller 104 can include a threshold comparison module 1104 to determine whether the number of the write/erase cycles 306 exceeds the throttle threshold 402. The threshold comparison module 1104 can track the current value of the write/erase cycles 306 of the memory sub-system 102 and compare the current value with the expected value using the throttle threshold 402. The threshold comparison module 1104 can identify the detection point 508 of FIG. 5 when the number of the write/erase cycles 306 exceeds the throttle threshold 402.

The memory controller 104 can include a half-point calculation module 1106 to determine the half-remaining life point 604 of FIG. 6 of the memory sub-system 102. The half-remaining life point 604 can be calculated by calculating half of the remaining operational life 606 of FIG. 6 of the memory sub-system 102. The half-remaining life point 604 can be at half of the remaining operational life 606 from the current life point 608 of FIG. 6.

The memory controller 104 can include a throttle calculation module 1108 to determine how much of the write operations 304 to throttle. The throttle calculation module 1108 can calculate the throttle rate in the write/erase cycles 306 per a predetermined unit time using the throttle line 602. The throttle calculation module 1108 can determine the throttle line 602 having the throttle slope 612 of FIG. 6. The throttle line 602 can be generated on a graph by plotting a line through the detection point 508 and the half-remaining life point 604.

The throttle slope 612 that is used to limit the number of the write operations 304 can be periodically re-calculated using the current value of the number of the write/erase cycles 306 at the current life point 608 and the half-remaining life point 604. The throttle slope 612 periodically re-calculated based on the update interval 802 of FIG. 8 can result in a curve to a plot of a number of the P/E cycles per day of the memory sub-system 102. The throttle slope 612 can be approximately the same as the threshold slope 408 as the throttle line 602 converges to the threshold line 406.

The memory controller 104 can include a point update module 1110 to determine the next instance of the update interval 802. The next instance of the update interval 802 can be calculated by adding a predetermined constant time to the current life point 608 as a current value of the drive life 302. As such, the number of the write/erase cycles 306 can be periodically performed using a constant value of the update interval 802.

The memory controller 104 can include an operation update module 1112 to determine the next total number of the write/erase cycles 306 to be performed after the update interval 802. The total number of the write/erase cycles 306 to be performed at the next instance of the update interval 802 can be determined based on whether the detection point 508 is identified.

If the detection point 508 is identified, the total number of the write/erase cycles 306 to be performed at the next instance of the update interval 802 can be determined by calculating a numerical value on the y-axis associated with the throttle line 602. The total number of the write/erase cycles 306 can be calculated at the next instance of the update interval 802 from the current life point 608 on the x-axis corresponding to the drive life 302 in FIG. 6.

If the detection point 508 is identified, the total number of the write/erase cycles 306 can be calculated as a sum of the current value of the write/erase cycles 306 and a product of the update interval 802 and the throttle slope 612. The total number of the write/erase cycles 306 can also be calculated as the next y-axis value of the throttle line 602 at the update interval 802 after the current life point 608.

The operation update module 1112 can convert the throttle rate into an equivalent number of the write operations 304 per a predetermined unit time. The throttle rate can be determined based on the throttle line 602 or the throttle slope 612. The operation update module 1112 can limit the number of the write operations 304 in order to reduce the number of the write/erase cycles 306.

If the detection point 508 is not identified, the total number of the write/erase cycles 306 can be calculated such that the memory sub-system 102 could be operated with the write operations 304 at the maximum write performance. The maximum write performance is achieved when the life throttling is not enabled or performed. For example, the maximum write performance can be achieved when all the memory devices 110 are configured to actively perform the write operations 304.

The memory controller 104 can include a device control module 1114 to interface with and configure the memory devices 110 for the life throttling. The device control module 1114 can control the memory devices 110 for purposes of throttling the write operations 304 at the physical level.

The device control module 1114 can determine an active device number 1116, which is defined as a number of the memory devices 110 that are enabled for performing the life throttling. The device control module 1114 can enable or disable a number of the memory devices 110 based on the active device number 1116 depending on how much of the life throttling the device control module 1114 needs to perform.

The term enable refers to configuring the memory devices 110 such that they are available for writing data. The device control module 1114 can select which of the memory devices 110 is to be disabled from writing data for the life throttling based on a number of factors including P/E cycle counts, bit error rates, program times, read thresholds, erase times, and any other estimation methods of determining how worn the memory devices 110 are.

For example, the device control module 1114 can enable all of the memory devices 110 to achieve the maximum write performance when the active device number 1116 is configured to a value equal to a total number of the memory devices 110. Also for example, the device control module 1114 can disable a number of the memory devices 110 to perform the life throttling when the active device number 1116 is configured to a value less than the total number of the memory devices 110.

The device control module 1114 can provide the credit scheme that allows the short, random bursts of the write activity to potentially exceed the throttle rate determined by the throttle threshold 402, while the write activity on an average can remain approximately equivalent or equal to the throttle rate imposed by the throttle threshold 402. The device control module 1114 can calculate a number of access credits 1118, which are defined as write transactions allowed to be performed in the memory devices 110. The access credits 1118 are the credits previously described.

The access credits 1118 provide a way for the write operations 304 to be performed by writing to the memory devices 110 even when the life throttling is active. In the periods where the write operations 304 are not occurring, the access credits 1118 can be accumulated. When a burst of the write activity from the host system 108 of FIG. 1 occurs, the write operations 304 can be performed uninhibitedly or continuously until the access credits 1118 are zero, at which time the write operations 304 can be limited by the current throttling rate based on the throttle threshold 402.

For example, the access credits 1118 can be expressed in terms of a number of pages per second. The access credits 1118 can be increased by one for every page that is not written per second. The access credits 1118 can be decreased by one for every page that is written per second when the life throttling occurs.

The memory controller 104 can include a point comparison module 1120 to determine whether the current life point 608 is at the target life point 610 of FIG. 6. If the current life point 608 is at the target life point 610, the memory controller 104 can either stop processing the life throttling or continue with the life throttling using the threshold line 406.

If the memory controller 104 is configured to continue with the life throttling, execution can continue to be performed with the point update module 1110, the operation update module 1112, and the device control module 1114. In this case, the operation update module 1112 can determine the next total number of the write/erase cycles 306 to be performed based on the threshold line 406. The next total number of the write/erase cycles 306 can be calculated as the next y-axis value of the threshold line 406 at the update interval 802 after the current life point 608.

It has been discovered that the operation update module 1112 for calculating the write/erase cycles 306 based on the detection point 508, the update interval 802, and the threshold line 406 having the half-remaining life point 604 and the throttle threshold 402 provides improved reliability by performing the life throttling. The operation update module 1112 provides the number of the write operations 304 to meet the target number of the write/erase cycles 306 at the particular operational lifetime.

It has also been discovered that the threshold comparison module 1104 for identifying the detection point 508 based on the throttle threshold 402 provides improved reliability since the life throttling is performed by calculating the number of the write/erase cycles 306 based on the detection point 508.

It has further been discovered that the threshold calculation module 1102 for calculating the throttle threshold 402 based on the threshold line 406 having the threshold offset 404 and the target life point 610 provides improved reliability since the life throttling is performed by identifying the detection point 508 based on the throttle threshold 402.

It has further been discovered that the device control module 1114 for calculating the number of the access credits 1118 based on the number of the write operations 304 provides improved performance since the access credits 1118 provide a way for the write operations 304 to be performed even when the life throttling is active.

It has further been discovered that the device control module 1114 for determining the active device number 1116 provides improved reliability since the active device number 1116 is used for disabling the number of the memory devices 110 thereby preventing the memory devices 110 from becoming worn out prior to the desired lifetime of the memory sub-system 102.

It has further been discovered that the number of the write/erase cycles 306 and the throttle slope 612 periodically recalculated at the update interval 802 provides improved reliability since the life throttling is performed as the throttle line 602 converges with the threshold line 406. The recalculation of the number of the write/erase cycles 306 and the throttle slope 612 provides an improved method for the life throttling compared to simple life throttling methods that limit the host write activity quickly because they lack the ability to anticipate long-term usage.

It has further been discovered that the write operations 304 limited at the physical level of the memory devices 110 provides improved reliability since the physical level guarantees that the memory sub-system 102 meets the target number of the write/erase cycles 306 at the particular operational lifetime. Therefore, the life throttling contributes to the ability of the memory sub-system 102 to operate at least at 10 full capacity writes per day for a period of at least five years.

Functions or operations of the memory controller 104 as described above can be implemented with the control unit 202 of FIG. 2, the storage unit 204 of FIG. 2, the memory interface unit 206 of FIG. 2, the host interface unit 208 of FIG. 2, or a combination thereof. For example, the threshold calculation module 1102 can be implemented with the control unit 202 to calculate the throttle threshold 402 based on the throttle line 602 having the threshold offset 404 and the target life point 610. Also for example, the threshold comparison module 1104 can be implemented with the control unit 202 to identify the detection point 508 based on the throttle threshold 402.

For example, the half-point calculation module 1106 can be implemented with the control unit 202 to calculate the half-remaining life point 604 of the memory sub-system 102. Also for example, the throttle calculation module 1108 can be implemented with the control unit 202 to generate the throttle line 602 having the throttle slope 612. Further, for example, the point update module 1110 can be implemented with the control unit 202 to calculate the next instance of the update interval 802.

For example, the operation update module 1112 can be implemented with the control unit 202 to calculate the number of the write/erase cycles 306 based on the detection point 508, the update interval 802, the throttle threshold 402, and the throttle line 602 having the half-remaining life point 604. Also for example, the device control module 1114 can be implemented with the control unit 202 to calculate the number of the access credits 1118 based on the number of the write operations 304 and determine the active device number 1116 less than the total number of the memory devices 110. Further, for example, the point comparison module 1120 can be implemented with the control unit 202 to determine whether the current life point 608 is at the target life point 610.

The threshold calculation module 1102 can be coupled to the threshold comparison module 1104. The threshold comparison module 1104 can be coupled to the half-point calculation module 1106. The half-point calculation module 1106 can be coupled to the throttle calculation module 1108.

The throttle calculation module 1108 can be coupled to the point update module 1110. The point update module 1110 can be coupled to the operation update module 1112. The operation update module 1112 can be coupled to the device control module 1114. The device control module 1114 can be coupled to the point comparison module 1120.

The physical transformation of calculating the number of the write/erase cycles 306 based on the detection point 508 and the throttle threshold 402 for writing the memory devices 110 results in movement in the physical world, such as people using the memory sub-system 102 of FIG. 1 based on the operation of the storage control system 100 of FIG. 1. As the movement in the physical world occurs, the movement itself creates additional information that is converted back in to calculate the throttle threshold 402 and identify the detection point 508 based on the throttle threshold 402 for the continued operation of the storage control system 100 and to continue the movement in the physical world.

The storage control system 100 is described module functions or order as an example. The modules can be partitioned differently. For example, the half-point calculation module 1106 and the throttle calculation module 1108 can be combined. Each of the modules can operate individually and independently of the other modules.

Furthermore, data generated in one module can be used by another module without being directly coupled to each other. For example, the device control module 1114 can receive the detection point 508 from the threshold comparison module 1104 to determine the active device number 1116 for enabling the number of the memory devices 110.

The threshold calculation module 1102, the threshold comparison module 1104, the half-point calculation module 1106, and the throttle calculation module 1108 can be implemented as hardware accelerators (not shown) within the control unit 202 or can be implemented as hardware accelerators (not shown) in the memory controller 104 or outside of the memory controller 104. The point update module 1110, the operation update module 1112, the device control module 1114, and the point comparison module 1120 can be implemented as hardware accelerators (not shown) within the control unit 202 or can be implemented as hardware accelerators (not shown) in the memory controller 104 or outside of the memory controller 104.

Figure 12:
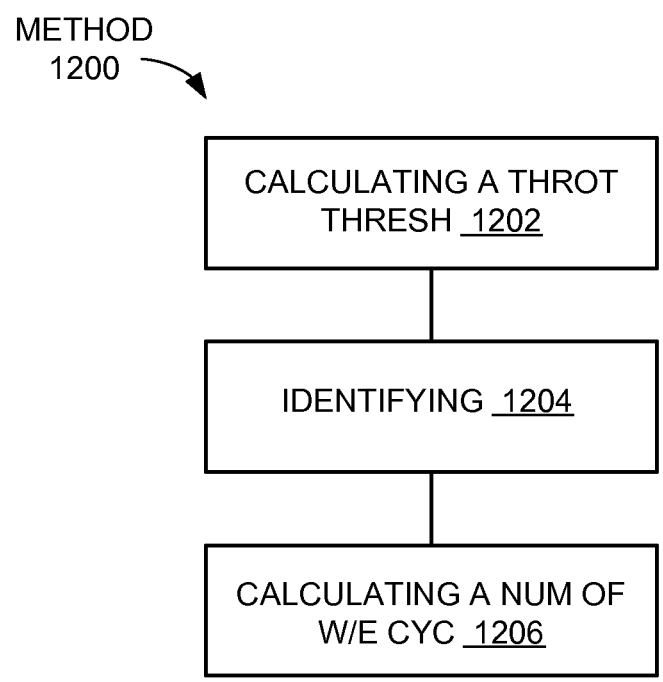
FIG. 12 is a flow chart of a method of operation of a storage control system in a further embodiment of the present invention.

Referring now to FIG. 12, therein is shown a flow chart of a method 1200 of operation of a storage control system in a further embodiment of the present invention. The method 1200 includes: calculating a throttle threshold in a block 1202; identifying a detection point based on the throttle threshold in a block 1204; and calculating a number of write/erase cycles based on the detection point and the throttle threshold for writing a memory device in a block 1206.

Thus, it has been discovered that the storage control system of the present invention furnishes important and heretofore unknown and unavailable solutions, capabilities, and functional aspects for a storage control system with data management mechanism. The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a storage control system for a storage device comprising:
   identifying a detection point at a point in time in accordance with a determination that the number of write/erase cycles for the storage device satisfies a time-varying throttle threshold;
   calculating a projected number of write/erase cycles corresponding to the detection point; and after identifying the detection point, limiting write operations for the storage device in accordance with the projected number of write/erase cycles.

2. The method as claimed in claim 1 including determining a current value, at the point in time, of the time-varying threshold based on a threshold offset.

3. The method as claimed in claim 1 wherein calculating the projected number of the write/erase cycles includes calculating the projected number of the write/erase cycles based on a threshold line having a half-remaining life point.

4. The method as claimed in claim 1 including accumulating access credits for accessing the storage device during periods in which write operations to the storage device do not occur, decreasing the access credits for accessing the storage device in accordance with write operations to the storage device, and enabling bursts of write operations to the storage device when the access credits for accessing the storage device are greater than zero.

5. The method as claimed in claim 1 further comprising periodically determining whether the number of write/erase cycles for the storage device satisfies a current value of the time-varying throttle threshold.

6. The method as claimed in claim 1 wherein the time-varying throttle threshold is determined based on a threshold line having a threshold offset and a target life point.

7. A storage control system comprising:
a storage device;
a memory controller; and
controller memory coupled to the memory controller, the controller memory including software that, when executed by the memory controller, cause the memory controller to:
identify a detection point at a point in time in accordance with a determination that the number of write/erase cycles for the storage device satisfies a time-varying throttle threshold;
calculate a projected number of write/erase cycles corresponding to the detection point; and
after identifying the detection point, limit write operations for the storage device in accordance with the projected number of write/erase cycles.

8. The system as claimed in claim 7 wherein the controller memory further includes software that, when executed by the memory controller, causes the memory controller to determine a current value, at the point in time, of the time-varying threshold based on a threshold offset.

9. The system as claimed in claim 7 wherein the controller memory further includes software that, when executed by the memory controller, causes the memory controller to calculate the projected number of the write/erase cycles based on a threshold line having a half-remaining life point.

10. The system as claimed in claim 7 wherein the controller memory further includes software that, when executed by the memory controller, causes the memory controller to accumulate access credits for accessing the storage device during periods in which write operations to the storage device do not occur, decrease the access credits for accessing the storage device in accordance with write operations to the storage device, and enable bursts of write operations to the storage device when the access credits for accessing the storage device are greater than zero.

11. The system as claimed in claim 7 wherein the controller memory further includes software that, when executed by the memory controller, causes the memory controller to determine an active device number for enabling a number of storage devices for throttling write operations when the detection point is identified, wherein the active device number is less than a total number of the storage devices.

12. The system as claimed in claim 7 wherein the controller memory further includes software that, when executed by the memory controller, causes the memory controller to calculate the number of the write/erase cycles based on an update interval.

13. The system as claimed in claim 7 wherein the controller memory further includes software that, when executed by the memory controller, causes the memory controller to determine the time-varying throttle threshold based on a threshold line having a threshold offset and a target life point.

14. The system as claimed in claim 7 wherein controller memory further includes software that, when executed by the memory controller, causes the memory controller to:
convert the number of the write/erase cycles into an equivalent number of write operations; and
accumulate access credits for accessing the storage device during periods in which write operations to the storage device do not occur, decrease the access credits for accessing the storage device in accordance with write operations to the storage device, and enable bursts of write operations to the storage device when the access credits for accessing the storage device are greater than zero.

15. A non-volatile storage device, comprising:
non-volatile memory; and
a memory controller that includes
one or more processors, and
controller memory storing one or more programs that when executed by the one or more processors cause the non-volatile storage device to perform operations including:
identifying a detection point at a point in time in accordance with a determination that the number of write/erase cycles for the storage device satisfies a time-varying throttle threshold;
calculating a projected number of write/erase cycles corresponding to the detection point; and
after identifying the detection point, limiting write operations for the storage device in accordance with the projected number of write/erase cycles.

16. The non-volatile storage device of claim 15, wherein the memory controller includes:
a threshold comparison module, coupled to a threshold calculation module, for identifying the detection point; and
an operation update module, coupled to the threshold comparison module, for calculating a projected number of write/erase cycles corresponding to the detection point;
a device control module, coupled to the operation update module, for, after identifying the detection point, limiting write operations for the storage device in accordance with the projected number of write/erase cycles.

17. The non-volatile storage device of claim 16, wherein the threshold calculation module is for determining a current value, at the point in time, of the time-varying threshold based on a threshold offset.

18. The non-volatile storage device of claim 16, wherein the operation update module is for calculating the projected number of the write/erase cycles based on a threshold line having a half-remaining life point.

19. The non-volatile storage device of claim 16, wherein:
the operation update module is for converting the number of the write/erase cycles into an equivalent number of write operations; and the device control module is for accumulating access credits for accessing the storage device during periods in which write operations to the storage device do not occur, decreasing the access credits for accessing the storage device in accordance with write operations to the storage device, and enabling bursts of write operations to the storage device when the access credits for accessing the storage device are greater than zero.

* * * * *